Patented Dec. 9, 1941

2,265,721

UNITED STATES PATENT OFFICE 2,265,721

DYESTUFF OF THE DIBENZANTHRONE SERIES

Joseph Deinet, Glassboro, N. J., assignor to E. I. du Pont de Nemours & Company, Wilmington, Del., a corporation of Delaware No Drawing. Application October 26, 1939, Serial No. 301,404

6 Claims. (Cl. 260—354)

This invention relates to the preparation of new dyestuffs of the dibenzanthrone series.

By the direct nitration of dibenzanthrone by the methods heretofore disclosed in the prior art, dyestuffs are obtained which dye cotton from the usual alkaline hydrosulfite vat in green shades. These dyes can be converted to black shades by treating the fiber dyed with such dyestuffs with relatively strong oxidizing agents. These dyes are therefore referred to as developed blacks of the vat dye series as distinguished from those dyes which dye in black shades from an alkaline hydrosulfite vat upon mere oxidation of the vatted dyestuff on the fiber with air or mild oxidizing agents employed in the ordinary vat dye process. Direct dyeing black dyestuffs of the dibenzanthrone series have been produced from nitro or amino dibenzanthronyls but in general, these black dyestuffs do not exhibit good printing properties and are therefore limited in their use.

It is an object of the present invention to prepare dyestuffs of the dibenzanthrone series which dye cotton and other cellulose fibers from the usual alkaline hydrosulfite vat in black shades and which are suitable for printing as well as for dyeing purposes.

It is a further object of the invention to provide a process for preparing direct black dyeing vat dyestuffs of the dibenzanthrone series by direct nitration of dibenzanthrone and to further convert these dyestuffs into direct black vat dyes which exhibit still improved dyeing properties by subjecting them to an alkaline fusion.

I have found that new and valuable direct dyeing black vat dyestuffs which are also particularly suitable for printing can be prepared by direct nitration of dibenzanthrone in chlorosulfonic acid or in a mixture of chlorosulfonic and sulphuric acids. During the nitration reaction, chlorination of the dibenzanthrone also takes place, giving a product which is essentially a dinitrodichlorodibenzanthrone, which on reduction or on vatting is converted to a diaminomonochlorodibenzanthrone which dyes and prints cotton and related fibers in black shades. In the reduction of the nitro derivatives with alkaline reducing agents some of the chlorine originally introduced into the molecule is split off so that the resulting dyestuff is essentially a diaminomonochlorodibenzanthrone. The dinitrodichlorodibenzanthrone or the resulting diamino-monochlorodibenzanthrone may be converted to a still different black vat dyestuff by treating with alkaline condensing agents such as alcoholic potassium hydroxide. These alkaline fusion products which are free of chlorine dye in a somewhat more greenish shade of black than the original black dyestuff and exhibit improved tinctorial strength. The nitration may be carried out with any of the usual nitrating agents such as nitric acid or the alkali metal nitrates. The amount of chlorosulfonic acid employed should be sufficient to chlorinate the dibenzanthrone to a dichloro compound in the presence of the nitrating agent. The sulphuric acid (100%) may be employed as the solvent in which the reaction is to be carried out.

The following examples are given to illustrate the invention. The parts used are by weight:

Example 1

100 parts of dibenzanthrone are dissolved in 1,000 parts of chlorosulfonic acid at a temperature of from 7 to 15° C. The solution is cooled to from 7 to 10° C. and at this temperature 80 parts of sodium nitrate are slowly added over a period of 4 hours. The mass is stirred at a temperature of 20 to 25° C. for at least 10 hours. The reaction is then completed by heating to 50–55° C. for 1 hour. The mass is then cooled to 20° C., poured into 6 liters of ice water, filtered, washed free from acid and dried. The product obtained analyzes 3.91% N and 13.03% Cl. It dyes cotton from a pure blue vat in gray to black shades having a greenish cast.

Example 2

100 parts of dibenzanthrone are dissolved in 500 parts of 100% sulfuric acid and 500 parts of chlorosulfonic acid at a temperature of from 7 to 15° C. The solution is cooled to 7–10° C. and at this temperature 80 parts of sodium nitrate are slowly added over a period of from 4 to 4½ hours. The mass is then stirred for several hours at 20–25° C., then heated to 50–55° C. and held for 1 hour. It is then cooled to 20° C., poured into 6 liters of ice water, filtered and washed free from acid. The cake is suspended in 2,000 parts of water, 350 parts of sodium sulfide (30%) are added, and the suspension is heated to 100° C. for ½ hour, then filtered and washed free from alkali and dried. The product obtained is a diamino-monochlorodibenzanthrone which dyes cotton from a pure blue vat in gray to black shades of good fastness properties.

Example 3

100 parts of dibenzanthrone are dissolved in 1,000 parts of chlorosulfonic acid at a temperature of from 7 to 15° C. The solution is cooled to 7-10° C. At this temperature 56 parts of 95% nitric acid are slowly added over a period of 4 hours. The mass is then stirred for several hours at 20-25° C., then heated to 50-55° C., and held for 1 hour. It is then cooled to 20° C. poured into 6 liters of ice water, filtered and washed free from acid. The product obtained is identical with that of Example 1.

Example 4

520 parts of potassium hydroxide and 260 parts of methanol are heated together to 120° C. While agitating, 130 parts of dinitrodichlorodibenzanthrone as obtained in Example 1 (or an equivalent quantity of the diamino-monochlorodibenzanthrone of Example 2) are slowly added at a temperature of 120-132° C. Thereafter, the mass is agitated at 130-132° C. for 4 hours. It is then drowned in 2,500 parts of water, heated to 85-90° C. and stirred for several hours, until completely oxidized. The mass is then filtered, and washed free from alkali. The product obtained dyes cotton from a red-violet vat in gray to black shades (green cast) of good fastness properties. This product is essentially free from chlorine, and the nitro groups have been reduced during the fusion.

The dyestuffs as above prepared exhibit improved printing properties over the direct black dyeing vat dyestuffs of this series heretofore described. They may also be employed in lacquer printing where black dyestuff pigments are required, or they may be converted to the leucosulfuric acid esters by the known methods, to be employed where solubilized vat dyes are demanded.

Impure dibenzanthrone which may contain some isodibenzanthrone or other vattable impurities may be converted to valuable black dyes by this process.

I claim:

1. The gray to black dyeing vat dyestuff of the dibenzanthrone series obtained by the process which comprises subjecting dibenzanthrone to dinitration with a nitrating agent in an acid solution of the class consisting of chlorosulfonic acid and a mixture of chlorosulfonic acid with sulfuric acid, the chlorosulfonic acid being used in sufficient amount to effect a dichlorination of the nitrodibenzanthrone.

2. A gray to black dyeing vat dyestuff obtained by the process which comprises subjecting dibenzanthrone to dinitration by means of a nitrating agent in chlorosulfonic acid.

3. A gray to black dyeing vat dyestuff obtained by the process which comprises subjecting dibenzanthrone to a dinitration by means of a nitrating agent in chlorosulfonic acid and fusing the resulting product with an alkaline condensing agent.

4. A gray to black dyeing vat dyestuff of the dibenzanthrone series obtained by the process which comprises subjecting dibenzanthrone to dinitration with a nitrating agent in an acid solution of the class consisting of chlorosulfonic acid and a mixture of chlorosulfonic acid with sulfuric acid, the chlorosulfonic acid being used in an amount sufficient to effect dichlorination of the nitrodibenzanthrone, and reducing the nitro groups introduced into said molecule to amine groups.

5. The process for preparing gray to black dyeing vat deystuffs of the dibenzanthrone series which comprises reacting upon dibenzanthrone in chlorosulfonic acid with a nitrating agent and fusing the resulting product with an alkaline condensing agent.

6. The process for preparing gray to black dyeing vat dyestuffs of the dibenzanthrone series which comprises reacting upon dibenzanthrone in chlorosulfonic acid with a nitrating agent.

JOSEPH DEINET.